US 10,862,146 B2

(12) United States Patent
Provost et al.

(10) Patent No.: US 10,862,146 B2
(45) Date of Patent: Dec. 8, 2020

(54) APPARATUS FOR DETERMINING REACTANT PURITY

(71) Applicant: Intelligent Energy Limited, Loughborough (GB)

(72) Inventors: Michael John Provost, Loughborough (GB); Kevin M. Kupcho, Loughborough (GB); Simon Edward Foster, Loughborough (GB); Ashley James Kells, Loughborough (GB)

( * ) Notice: Subject to any disclaimer, the term of this patent is extended or adjusted under 35 U.S.C. 154(b) by 1053 days.

(21) Appl. No.: 15/312,250

(22) PCT Filed: May 5, 2015

(86) PCT No.: PCT/GB2015/051313
§ 371 (c)(1),
(2) Date: Nov. 18, 2016

(87) PCT Pub. No.: WO2015/177506
PCT Pub. Date: Nov. 26, 2015

(65) Prior Publication Data
US 2017/0098840 A1  Apr. 6, 2017

(30) Foreign Application Priority Data

May 19, 2014  (GB) .................................. 1408866.0

(51) Int. Cl.
*H01M 8/0444* (2016.01)
*H01M 8/249* (2016.01)
(Continued)

(52) U.S. Cl.
CPC ... *H01M 8/04447* (2013.01); *H01M 8/04455* (2013.01); *H01M 8/04559* (2013.01);
(Continued)

(58) Field of Classification Search
None
See application file for complete search history.

(56) References Cited

U.S. PATENT DOCUMENTS

| 9,726,365 B1 | 8/2017 | Kirk et al. |
| 2004/0081867 A1 | 4/2004 | Edlund |

(Continued)

FOREIGN PATENT DOCUMENTS

| CN | 101390235 A | 3/2009 |
| DE | 10 2011 015 744 A1 | 10/2012 |

(Continued)

OTHER PUBLICATIONS

International Preliminary Report on Patentability in PCT/GB2015/051313, dated Nov. 22, 2016, 9 pages.

(Continued)

*Primary Examiner* — Wojciech Haske
(74) *Attorney, Agent, or Firm* — BakerHostetler

(57) ABSTRACT

An apparatus (10) configured to determine reactant purity comprising: a first fuel cell (11) configured to generate electrical current from the electrochemical reaction between two reactants, having a first reactant inlet (13) configured to receive a test reactant comprising one of the two reactants from a first reactant source (7, 5, 16); a second fuel cell (12) configured to generate electrical current from the electrochemical reaction between the two reactants, having a second reactant inlet (14) configured to receive the test reactant from a second reactant source (5); a controller (20) configured to apply an electrical load to each fuel cell and determine an electrical output difference, $OD_r$, between an electrical output of the first fuel cell (11) and an electrical output of the second fuel cell (12), and determine a difference between a predicted output difference and the determined electrical output difference, $OD_r$, the predicted output difference determined based on a historical output of differ- (Continued)

ence and a historical rate of change in said output difference determined at an earlier time, said controller (20) configured to provide a purity output indicative of the test reactant purity at least based on the difference between the predicted and determined output difference.

13 Claims, 3 Drawing Sheets

(51) Int. Cl.
      *H01M 8/04992*    (2016.01)
      *H01M 8/04537*    (2016.01)
      *H01M 8/0612*     (2016.01)

(52) U.S. Cl.
      CPC ....... *H01M 8/04992* (2013.01); *H01M 8/249* (2013.01); *H01M 8/0612* (2013.01); *H01M 2250/00* (2013.01); *H01M 2250/10* (2013.01); *Y02B 90/14* (2013.01); *Y02P 90/40* (2015.11)

(56) References Cited

U.S. PATENT DOCUMENTS

2008/0299422 A1* 12/2008 Perry ................ H01M 8/04089
                                                        429/441
2011/0300463 A1* 12/2011 Reinert ............. H01M 8/04559
                                                        429/432

FOREIGN PATENT DOCUMENTS

| DE | 102011015744 A1 | 10/2012 |
|---|---|---|
| EP | 1339125 A2 | 8/2003 |
| GB | 2478190 A | 8/2011 |
| GB | 2497787 A | 6/2013 |
| JP | 2006 059745 A | 3/2006 |
| JP | 2006059745 A | 3/2006 |
| JP | 2012-142122 A | 7/2012 |
| JP | 2015-507326 A | 3/2015 |
| WO | WO 2013/093461 A1 | 6/2013 |

OTHER PUBLICATIONS

Search Report under Section 17(5) in Appln. No. GB1408866.0, dated Nov. 19, 2014, 4 pages.
Written Opinion in PCT/GB2015/051313, dated Aug. 7, 2015, 8 pages.
International Search Report in PCT/GB2015/051313, dated Aug. 7, 2015, 4 pages.
Search Report under Section 17(6) in GB1408866.0, dated Dec. 4, 2015, 2 pages.
M.J. Provost, "Kalman Filtering Applied to Time Series Analysis", The Institution of Electrical Engineers, 2003, 7 pages.
M. J. Provost, "The Use of Optimal Estimation Techniques in the Analysis of Gas Turbines", Cranfield University Ph.D. Thesis, Dec. 1994, 232 pages.
T. R. Benedict, et al., "Synthesis of an Optimal Set of Radar Track-While-Scan Smoothing Equations", IRE Transactions on Automatic Control, Oct. 4, 1961, 6 pages.

\* cited by examiner

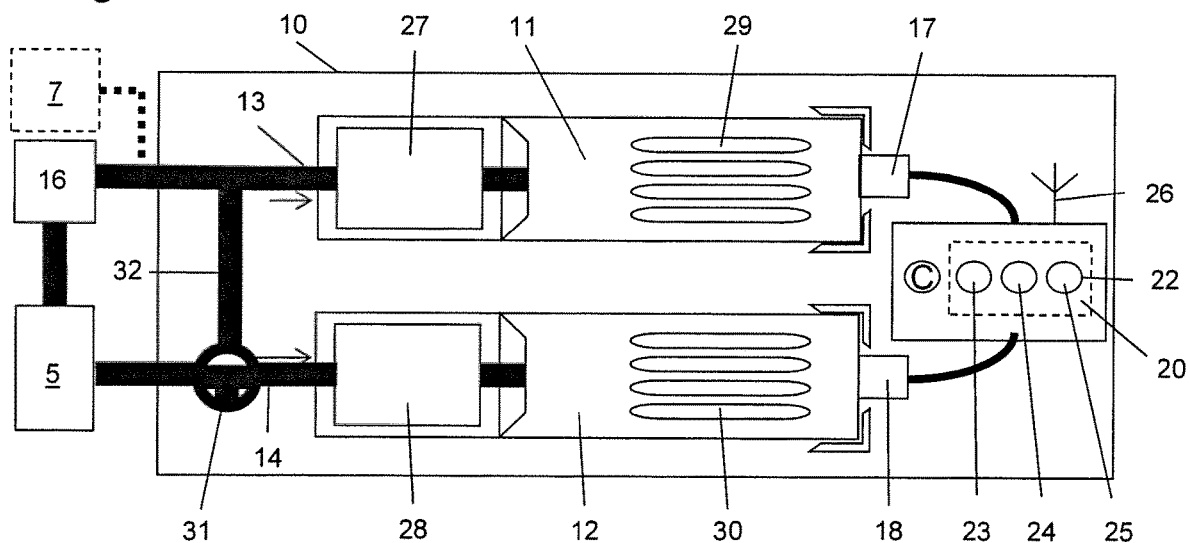
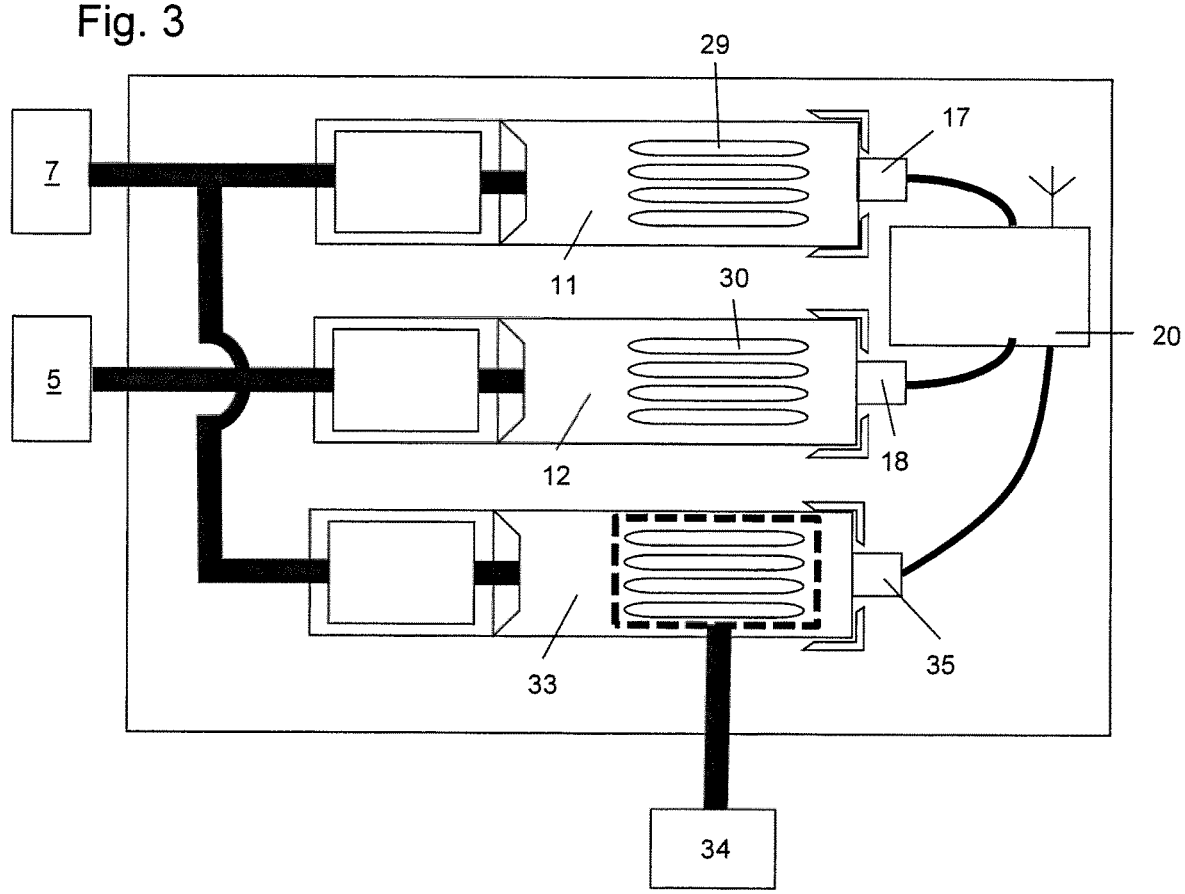

US 10,862,146 B2

APPARATUS FOR DETERMINING REACTANT PURITY

CROSS REFERENCE TO RELATED APPLICATIONS

This is a National Phase entry of International Application No. PCT/GB2015/051313, filed May 5, 2015, which claims priority to Great Britain Application No. 1408866.0, filed May 19, 2014, the disclosures of which are incorporated herein by reference in their entireties.

BACKGROUND OF THE INVENTION

This invention relates to an apparatus configured to determine the purity of a reactant. In particular, it relates to an apparatus for determining the purity of a fuel, such as hydrogen, and/or an oxidant, such as air. It also relates to a filling station or stationary power device including the apparatus and a method of determining reactant purity.

The use of hydrogen as a fuel for the generation of electrical power in fuel cells is becoming of increasing importance. Purity of the hydrogen supply is important for optimal electrical power generation and for maintaining fuel cells using that hydrogen in optimal condition.

Currently, hydrogen used in fuel cell systems is often synthesized through the steam reforming of natural methane gas. Even where best quality practices are used, a number of contaminants may be present in the hydrogen fuel which are harmful to fuel cell operation. Although the harm is usually reversible, in the worst cases a high degree of contamination may be present including some compounds which may cause irreversible harm to the fuel cell.

BRIEF SUMMARY OF THE INVENTION

According to a first aspect of the invention, we provide an apparatus configured to determine reactant purity comprising;
 a first fuel cell configured to generate electrical current from the electrochemical reaction between two reactants, having a first reactant inlet configured to receive a test reactant comprising one of the two reactants from a first reactant source;
 a second fuel cell configured to generate electrical current from the electrochemical reaction between the two reactants, having a second reactant inlet configured to receive the test reactant from a second reactant source;
 a controller configured to apply an electrical load to each fuel cell and determine an electrical output difference, $OD_t$, between an electrical output of the first fuel cell and an electrical output of the second fuel cell, and determine a difference between a predicted output difference and the determined electrical output difference, $OD_t$, the predicted output difference determined based on a historical output difference and a historical rate of change in said output difference determined at an earlier time,
 said controller configured to provide a purity output indicative of the test reactant purity at least based on the difference between the predicted and determined output difference.

This is advantageous as it has been found that determining a prediction of what the output difference is going to be at a later time based on historical measurements and then, at the later time, determining the output difference and making a comparison provides an effective way of determining or monitoring reactant purity. The historical values may comprise a previously determined difference or rate of change or a historical average of the difference or rate of change.

The controller may be configured to determine at least three indicators at time t using two of the same indicators previously determined at an earlier time t−1, the indicators comprising a $Delta_t$ indicator representative of the difference between a predicted output difference and the determined output difference, a smoothed level indicator $SL_t$, and a rate of change indicator $ROC_t$, wherein;

$$Delta_t = OD_t - (SL_{t-1} + \Delta t \times ROC_{t-1})$$

$$SL_t = (SL_{t-1} + \Delta t \times ROC_{t-1}) + \alpha_1 \times Delta_t$$

$$ROC_t = ROC_{t-1} + \alpha_2 \times Delta_t$$

and $\Delta t$ comprises the time difference between time t and t−1, and $\alpha_1$ and $\alpha_2$ comprise predetermined values, wherein the purity output is determined using said indicators.

These indicators have been found to be effective at identifying deterioration of reactant quality over time, while being computationally efficient.

The purity output may be determined using the electrical output difference, $OD_t$.

The first reactant source may provide a reference reactant of the test reactant, the reference reactant having a known purity and the second reactant source provides a fuel of an unknown purity. The first reactant source may comprise a purification device, the purification device configured to purify part of the test reactant supplied from the second reactant source.

Thus, the apparatus is configured to determine the electrical output of two fuel cells that are substantially identical other than the fuel that is supplied to them. It may be assumed that the reference reactant is pure while the test reactant has an unknown purity which the present apparatus may determine relative to the reference reactant.

Optionally the test reactant comprises a fuel. The fuel may comprise hydrogen. Optionally the test reactant comprises an oxidant, such as atmospheric air. The reactant may be for supply to a fuel cell power source, such as a fuel cell powered vehicle or a stationary power device.

The output difference may be determined based on an average of a plurality of sampled electrical output values from the first fuel cell and the second fuel cell. Thus, a plurality of output values may be averaged and the difference determined or a plurality of output differences determined and then averaged. The average may comprise a modal, mean or median average, measure of central tendency or any other average.

The controller may be configured to determine if the rate of change indicator exceeds a predetermined threshold range and, if so, provide a warning of changing reactant purity. The controller may be configured to determine if the smoothed level indicator exceeds a predetermined threshold range and, if so, provide an indication that the reactant purity is unacceptable. The controller may be configured to determine if the $Delta_t$ indicator exceeds a predetermined threshold range and, if so, provide an indication that the reactant purity is unacceptable. Thus, the controller may only raise an alarm or warning if a predetermined threshold is exceeded. Alternatively, it may provide a plurality of warnings based on a plurality of thresholds.

The apparatus may include a third fuel cell configured to generate electrical current from the electrochemical reaction between the two reactants, wherein the test reactant comprises a first test reactant and the other of the two reactants comprises a second test reactant;

the first fuel cell configured to receive the first test reactant from the first reactant source and the second test reactant from a fourth reactant source;

the second fuel cell configured to receive the first test reactant from the second reactant source and the second test reactant from the fourth reactant source;

the third fuel cell configured to receive the first test reactant from the first reactant source and the second test reactant from a third reactant source, the controller configured to determine an electrical output difference, $OD_t$, between an electrical output of the first and second fuel cell;

first and third fuel cell; and second and third fuel cell, the controller configured to give an indication of the first test reactant purity and the second test reactant purity at least based on a difference between a predicted output difference and the determined output difference, $OD_t$, the predicted output difference determined based on a historical output difference and a historical rate of change in said output difference for each of the output differences.

The first test reactant may comprise a fuel and the second test reactant comprises air; the first reactant source comprising a pure fuel source; the second reactant source comprising a fuel source of unknown purity; the third reactant source comprising a pure air source or an air source of unknown purity and the fourth reactant source comprising the other of the pure air source and air source of unknown purity.

The controller may be configured to output an indication of the performance difference between the third fuel cell and the second fuel cell. Thus, the output difference between second and third fuel cells may provide an indication of fuel cell health.

The first fuel cell may comprise a plurality of series-connected fuel cells in a stack and/or in which the second fuel cell comprises a plurality of series-connected fuel cells in a stack.

According to a second aspect of the invention we provide a method for determining an indication of reactant purity comprising;

measuring an electrical output of a first fuel cell having a load applied thereto and configured to generate electrical current from the electrochemical reaction between two reactants, one of the two reactants comprising a test reactant supplied from a first reactant source to the first fuel cell;

measuring an electrical output of a second fuel cell having a load applied thereto and configured to generate electrical current from the electrochemical reaction between the two reactants, the test reactant supplied to the second fuel cell supplied from a second reactant source;

determining an electrical output difference, $OD_t$, between an electrical output of the first fuel cell and an electrical output of the second fuel cell, providing an indication of the test reactant purity at least based on a difference between a predicted output difference and the determined output difference, the predicted output difference determined based on a historical output difference and a historical rate of change in said output difference.

The step of providing an indication may comprise;

determining at least three indicators at time t using two of the same indicators previously determined at time t−1, the indicators comprising a $Delta_t$ indicator representative of the difference between a predicted output difference and the determined output difference, a smoothed level indicator $SL_t$, and a rate of change indicator $ROC_t$, wherein;

$$Delta_t = OD_t - (SL_{t-1} + \Delta t \times ROC_{t-1})$$

$$SL_t = (SL_{t-1} + \Delta t \times ROC_{t-1}) + \alpha_1 \times Delta_t$$

$$ROC_t = ROC_{t-1} + \alpha_2 \times Delta_t$$

and $\Delta t$ comprises the time difference between time t and t−1, and $\alpha_1$ and $\alpha_2$ comprise predetermined values, wherein the method further comprises providing the indication of reactant purity using said indicators.

The method may comprise the step of providing the purity output, comprising an indication of test reactant purity, based on the electrical output difference, $OD_t$.

The step of determining the electrical output difference may comprise determining an average of a plurality of sampled electrical output values from the first fuel cell and the second fuel cell and using said average values to determine the electrical output difference.

The method may comprise determining if the rate of change indicator exceeds a predetermined threshold range and, if so, provide a warning of changing reactant purity using said purity output. The method may comprise determining if the smoothed level indicator exceeds a predetermined threshold range and, if so, provide an indication that the reactant purity is unacceptable using said purity output. The method may comprise determining if the $Delta_t$ indicator exceeds a predetermined threshold range and, if so, provide an indication that the reactant purity is unacceptable.

The method may comprise the step of measuring an electrical output of a third fuel cell having a load applied thereto and configured to generate electrical current from the electrochemical reaction between two reactants, wherein the test reactant comprises a first test reactant and the other of the two reactants comprises a second test reactant, the first fuel cell configured to receive the second test reactant from a third reactant source, the second fuel cell is configured to receive the second test reactant from the third reactant source, and the third fuel cell is configured to receive the first test reactant from the first reactant source and the second test reactant from a fourth reactant source, the method further including the step of determining an electrical output difference, $OD_t$, between an electrical output of the first and second fuel cell first and third fuel cell; and second and third fuel cell, and providing an indication of the first test reactant purity and the second test reactant purity using a difference between a predicted output difference and the determined output difference, the predicted output difference determined based on a historic output difference and a historic rate of change in said output difference for each of the output differences.

According to a third aspect of the invention we provide a computer program or computer program product comprising code which, when executed by a processor causes an apparatus to perform the method of the second aspect.

According to a fourth aspect of the invention we provide a reactant distribution system configured to receive a reactant purity indicator from each of a plurality of sensors located at geographically disparate reactant use locations and identify a location associated with each of the received indicators with reference to a reactant distribution network configured to supply reactant to the reactant use locations, the system adapted to reconfigure the reactant distribution network and/or disable the use of reactant at one or more reactant use locations in response to a received indicator that is representative of poor reactant purity from a particular reactant use location based on the location of said particular reactant use location in the reactant distribution network.

The reactant use locations may comprise reactant dispensing locations, such as filling stations. Alternatively, the reactant use locations may comprise stationary power devices that consume reactant supplied thereto.

The system may be configured to reconfigure the reactant distribution network by inhibiting the distribution of reactant to part of the reactant distribution network downstream of the dispensing location from which the indicator of poor reactant purity is received. This prevents further reactant use locations from receiving poor purity reactant (if it is assumed that the cause of the impurity is from the delivered reactant). The downstream locations can be determined from the distribution network.

The system may be configured to disable the use of reactant at one or more reactant use locations by being configured to, using the reactant distribution network, identify one or more reactant use locations that received reactant from a common reactant source as the particular reactant use location and provide for the disablement of said identified reactant use locations. Thus, the reactant use locations can be stopped from using or dispensing the poor quality reactant as the reactant distribution network is used to determine which locations received reactant from the same source as the particular use location that has the poor reactant purity problem. Also, in the case of the reactant use location comprising a stationary power device, for example, each unit may consume reactant at different rates. Therefore, by determining, automatically, which use locations, upstream or downstream, received the reactant from the same source provides an advantageous reactant distribution network.

The system may be configured to provide a valve close signal, in real time, for actuation of a valve in the reactant distribution network to prevent the flow of reactant along a distribution conduit downstream of the dispensing location from which the indicator of poor reactant purity is received.

The system may be configured to provide a signal, in real time, to prevent distribution of reactant from a batch of reactant to a reactant dispensing location(s) downstream along a predetermined route from the dispensing location from which the indicator of poor reactant purity is received and which also received reactant from said batch of reactant.

The system may be configured to provide an alternate supply signal to reconfigure the reactant distribution network such that the reactant dispensing locations located in the part of the reactant distribution network downstream of the dispensing location from which the indicator of poor reactant purity is received, are supplied with reactant from a different part of the network.

The alternate supply signal may comprise;
i) an instruction to open a valve in the reactant distribution network to supply the affected reactant dispensing locations from an alternate part of the network; or
ii) an instruction to dispatch a batch of reactant to one or more of the reactant dispensing locations located in the part of the reactant distribution network downstream of the dispensing location from which the indicator of poor reactant purity is received;
iii) an instruction to divert a batch of reactant from its predetermined route to one or more of the reactant dispensing locations located in the part of the reactant distribution network downstream of the dispensing location from which the indicator of poor reactant purity is received.

The system may be configured to provide an inhibition signal to one or more of the identified reactant use locations to inhibit the use of reactant received from the common source. Thus, the reactant use location may switch to a different reactant source, if present, or be disabled until the reactant distribution network delivers reactant from a different source. Further, with reference to the distribution network, not only the reactant use location that generated the poor reactant purity indication can be inhibited. This can prevent damage or the further distribution of poor quality reactant at other reactant use locations.

According to a fifth aspect of the invention we provide a method or computer program or computer program product comprising code which, when executed by a processor performs the steps of;
receiving a reactant purity indicator from each of a plurality of sensors located at geographically disparate reactant use locations;
identifying a location associated with each of the received indicators with reference to a reactant distribution network configured to supply reactant to the reactant use locations,
sending an instruction to reconfigure the reactant distribution network and/or disable the use of reactant at one or more reactant use locations in response to a received indicator that is representative of poor reactant purity from a particular reactant use location based on the location of said particular reactant use location in the reactant distribution network.

DESCRIPTION OF THE DRAWINGS

There now follows, by way of example only, a detailed description of one or more embodiments of the invention with reference to the accompanying drawings, in which;

FIG. 1 shows a schematic diagram of a first example apparatus utilising two fuel cells and configured to determine the purity of a reactant;

FIG. 3 shows a schematic diagram of a first example apparatus utilising three fuel cells and configured to determine the purity of two reactants.

DETAILED DESCRIPTION OF THE INVENTION

Figure 2A:
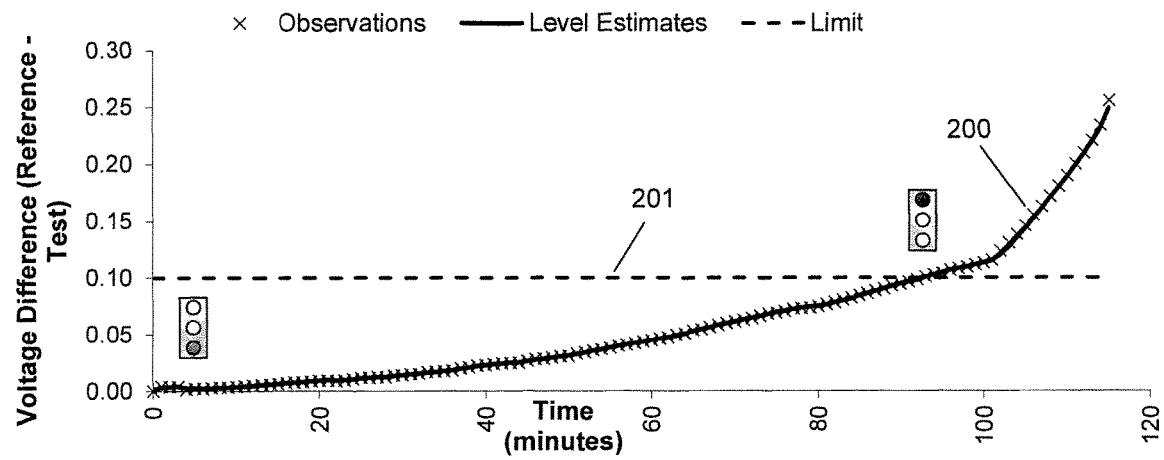
FIGS. 2a to c show a series of graphs illustrating the variation of several indicators of reactant purity over time for an example data set.

An apparatus for determining reactant purity 10 is shown in FIG. 1. The apparatus 10 has particular application for determining the purity of a fuel, such as hydrogen. Accordingly, the apparatus 10 may form part of a fuel filling station for fuel cell powered devices, such as vehicles. The apparatus may thus be configured to monitor the purity of the fuel stored or supplied to a filling station for contamination detection and can assess fuel purity before it is delivered to customers. The apparatus can also be used to monitor the hydrogen supply being fed to an operational or "primary" fuel cell being used as an electrical power supply for a building or vehicle or communications infrastructure, for example. The invention is also useful for determining reactant purity for fuel cell based stationary power devices that provide power or backup power for equipment such as mobile telecommunications masts. The apparatus can be used as a periodic testing system or as an "in-line", continuously-operating reactant/fuel monitor.

The apparatus may also determine the purity of other reactants, such as an oxidant. Fuel cells may utilise atmospheric air as the oxidant and accordingly, the apparatus may be used to assess air purity. This is advantageous, as the apparatus may be configured to provide information on changes in fuel and/or air purity.

The apparatus uses a configuration of at least two fuel cells in order to monitor reactant purity. An advantage of using fuel cells to determine the reactant purity is that it is relatively inexpensive compared to existing elemental analysis apparatus and methods. Another advantage of a fuel cell based purity monitoring system is that, by their very nature, the fuel cells performing the purity monitoring can readily be configured to be sensitive to exactly the same contaminants that are harmful to operation of a primary fuel cell stack with which the purity monitor can be associated.

FIG. 1 shows a schematic diagram illustrating the principles of operation of a first configuration of the apparatus 10. The purity monitor 10 includes a first fuel cell 11 and a second fuel cell 12. The first fuel cell 11 is a reference fuel cell and may further comprise a number of individual fuel cells disposed in series-connected configuration as a reference fuel cell stack 11. The second fuel cell 12 is a test fuel cell and may further comprise a number of individual fuel cells disposed in series-connected configuration as a test fuel cell stack 12. The reference cell 11 has a fuel inlet 13 and the test cell 12 has a fuel inlet 14. In this arrangement, the fuel inlets 13, 14 are both supplied from a common hydrogen source 5. Hydrogen source 5 may be any form of hydrogen source including, but not limited to, any form of storage tank or vessel, a continuous piped supply, or a hydrogen generator such as a steam reforming system. The fuel inlet 13 is connected to the hydrogen source 5 by way of a purifier 16. Accordingly, the purifier 16 can be considered to be a source of pure hydrogen. The purifier 16 may be any form of filter capable of removing contaminants that would degrade the electrical performance of the reference fuel cell 11 and the test fuel cell 12. For example, any form of catalyst-activated purifier could be used. A preferred purifier is a palladium membrane. The purifier 16 is preferably situated between the inlet 13 and the hydrogen source 5. Any suitable purifier or in-line gas purification method may be used, such as those based on an adsorption method using porous media or pressure swing adsorption. A range of possible hydrogen purifiers are commercially available, such as the Micro-Torr® range from SAES Pure Gas Inc.

In other embodiments the inlet 13 may connect to a separate pure hydrogen fuel source 7 (shown in dashed lines in FIG. 1) instead of the purifier 16.

The fuel cells 11 and 12 comprise portable consumer fuel cell power supplies that are configured to receive a replaceable source of fuel. The use of consumer units in the purity determination apparatus is cost effective and, given that such units may be mass produced, they typically have good uniformity in their performance. Rather than receive the fuel from a replaceable fuel source, the fuel cells 11 and 12 are configured to receive the supply from the fuel source 16 comprising the purifier and the fuel source 5 respectively.

A calibration valve 31 enables both fuel cells 11 and 12 to be fed with the same reactant, which in this embodiment is the purified or pure hydrogen. The calibration valve 31 may be actuated such that the fuel cell 12 receives pure hydrogen via conduit 32. With the calibration valve 31 in this position the controller 20 may perform a calibration procedure in order to determine and calibrate out any systematic electrical output differences between fuel cells 11 and 12 by suitably adjusting controller 20. In normal use, the calibration valve 31 can be actuated such that the second fuel cell 12 receives hydrogen from source 5 and the first fuel cell 11 receives hydrogen from source 7 or purifier 16.

The first, reference fuel cell 11 has an electrical output 17 and the second, test fuel cell 12 has an electrical output 18. Both electrical outputs 17, 18 are connected to a controller 20. The controller 20 is configured to apply an electrical load (not shown) to each of the fuel cells 11, 12 and to monitor the electrical outputs 17, 18 of the fuel cells 11, 12. The controller 20 is also configured to compare the electrical outputs to determine an electrical output difference between the fuel cells 11, 12. In this embodiment the electrical outputs 17, 18 comprise USB outputs that connect, via a USB cable, to the controller 20. The electrical output comprises a voltage. In particular, the controller may measure the fuel cell voltages at a constant output current. Alternatively, the controller may measure an output current at a constant voltage for each of the fuel cells 11, 12.

The controller 20 also provides a purity output 22 configured to give an indication of the fuel reactant purity of the hydrogen source 5 based on an output of the controller 20. In this embodiment, the purity output 22 is in the form of a traffic light system. In particular, a green light 23 shows that the fuel/reactant quality is acceptable within predetermined limits, an amber light 24 indicates a warning of changing reactant purity and a red light 25 indicates an unacceptable reactant purity. It will be appreciated that other indicators may be used such as a display. The controller 20 further includes a wireless communication element represented by antenna 26 to transmit measurements or its determination of reactant purity to another device. Thus, in another embodiment, the controller may comprise a data collection part connected to the fuel cells and a data analysis part remote from the fuel cells and connected to the data collection part via a communication link configured to determine the reactant quality from the collected data. The functionality of the controller may be embodied as software executed on a processor which receives the output from fuel cells 11, 12.

In use, the first fuel cell 11 receives hydrogen fuel from the purifier 16, which in turn receives the fuel from hydrogen source 5. The second fuel cell 12 receives fuel directly from the hydrogen source without purification. The hydrogen source 5 thus supplies the reactant to be tested. The fuel inlet 13 and the fuel inlet 14 each connect to a respective pressure regulator 27, 28 to ensure that each fuel cell is supplied with fuel at the same rate. Both fuel cells 11, 12 receive atmospheric air as the other reactant via air inlets 29, 30. The fuel cells 11, 12 are located side by side and therefore it is assumed that they both receive air of the same purity such that any difference in their electrical output will be caused by the difference between the supply of purified fuel to the first fuel cell 11 and the un-purified test fuel to the second fuel cell 12.

The fuel cells 11, 12 generate electrical power and the controller is configured to periodically determine a difference, $OD_r$, in the electrical output between them. In particular, in this example, the controller is configured to sample the electrical output voltage each second. Each minute, the controller is configured to take an average of the electrical output voltage over the previous 60 seconds and, using the average electrical output, determine an electrical output (voltage) difference. Thus, at time t, the controller determines an output difference $OD_t$. The output difference of the preceding period is designated $OD_{t-1}$.

The controller 20 is configured to predict what the output difference $OD_t$ is going to be based on a historic output difference and a historic rate of change in said output difference. For initialisation, the historic output difference and the historic rate of change may each comprise a predetermined value. Otherwise, the historic output difference and historic rate of change may be calculated at each time interval t. The historic output difference may comprise a previously determined output difference and, likewise, the historic rate of change may comprise a previously determined rate of change. The controller 20 is then configured to determine a further difference between the predicted output difference and the output difference $OD_t$. The controller may determine whether or not this further difference lies within predetermined a threshold or limits and, based on this assessment, the controller may provide a purity output 22, which may comprise an alert, value or warning that the reactant purity supplied to fuel cell 12 is changing or outside acceptable limits. In this example, such an alert indicates that the hydrogen purity from source 5 may be poor.

In a further example, the controller is configured to give an indication of reactant purity based on any one of at least three indicators or parameters determined at time t using two of the same indicators previously determined at time t−1, namely $SL_{t-1}$ and $ROC_{t-1}$. The indicators comprising a Delta indicator representative of the difference between a predicted output difference and the determined output difference as described above, a smoothed level indicator $SL_t$, and a rate of change indicator $ROC_t$, wherein;

$$Delta_t = OD_t - (SL_{t-1} + \Delta t \times ROC_{t-1}) \quad (1)$$

$$SL_t = (SL_{t-1} + \Delta t \times ROC_{t-1}) + \alpha_1 \times Delta_t \quad (2)$$

$$ROC_t = ROC_{t-1} + \alpha_2 \times Delta_t \quad (3)$$

$\Delta t$ comprises the time difference between time t and t−1, and $\alpha_1$ and $\alpha_2$ comprise predetermined values. $\alpha_1$ and $\alpha_2$ may comprise constants. $\alpha_1$ and $\alpha_2$ may be used to tune the sensitivity of the indicators to changes in the other indicators. Further, $\alpha_1$ and $\alpha_2$ may be related such that;

$$\alpha_2 = \alpha_1^2 / ((2 - \alpha_1) \times \Delta t) \quad (4)$$

Accordingly, equation 3 becomes;

$$ROC_t = ROC_{t-1} + (\alpha_1^2 / ((2 - \alpha_1) \times \Delta t)) \times Delta_t \quad (5)$$

$\alpha_1$ may be chosen between 0 and 1 to give a compromise between (a) smoothing out the noise in the observations (small $\alpha_1$) and (b) allowing discrete features of the time series to be represented by the indicators (large $\alpha_1$). Other relationships between $\alpha_1$ and $\alpha_2$ are possible. For example, $\alpha_2 = \alpha_1^2 / (2 - \alpha_1)$ is a possible relationship that may yield advantageous results.

The indicators $Delta_t$, smoothed level indicator $SL_t$, and rate of change indicator $ROC_t$ may each have associated threshold levels or ranges. The smoothed level indicator represents a historic output difference and the rate of change indicator represents a historic rate of change. Accordingly, when it is determined that any one of the indicators has exceeded or falls outside its predetermined threshold/range, the purity output 22, may be configured to generate an alert.

In this embodiment, using the traffic light warning system, the Rate of Change indicator is used to give an amber warning ahead of a red alert. Further, the Smoothed Level indicator and the Delta output are used to give a red alert if there is either a consistently high voltage difference between the fuel cells 11, 12 or a sudden 'spike' or 'jump' in the voltage difference between the fuel cells 11, 12.

Figure 2B:
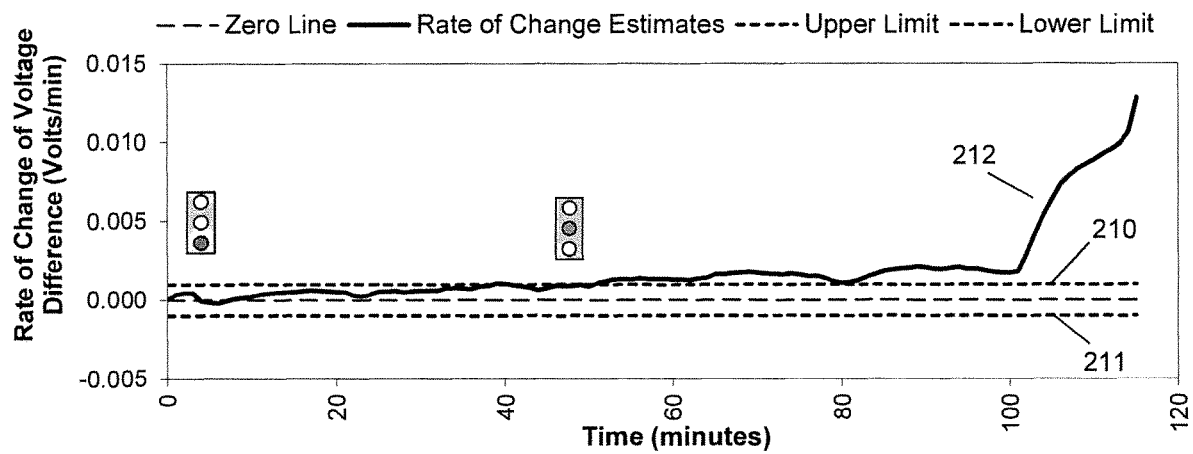
Figure 2C:
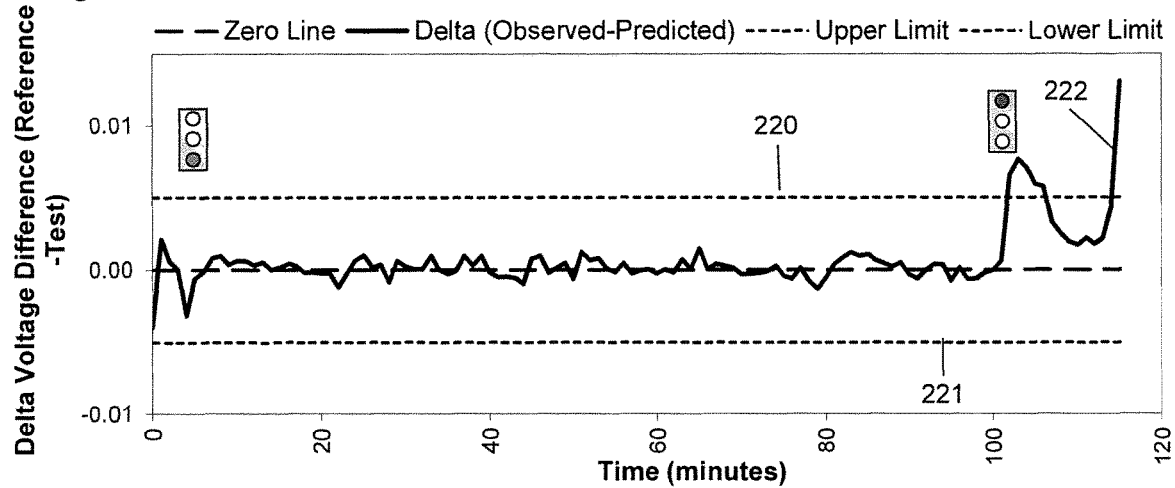

FIGS. 2a to 2c show an example data set to demonstrate the changes in the indicators and how they may be used to warn a user of possibly deteriorating or poor reactant purity.

FIG. 2a shows the voltage output difference 200 between fuel cell 11 and fuel cell 12. Initially, the output difference is within its associated threshold 201 and the green light 23 is illuminated to show the user that the fuel purity is acceptable. It can be seen that the output difference value crosses a threshold value of 0.1 Volts after approximately 93 minutes from when monitoring started. This provides an indication that the fuel purity may have fallen below an acceptable limit. Accordingly, the red light 25 is illuminated.

FIG. 2b shows a plot of the Rate of Change indicator $ROC_t$ labelled 212. The Rate of Change indicator has an associated threshold range between +0.001 and −0.001 and labelled 210, 211. The range is exceeded after approximately 50 minutes. The controller is configured to use the Rate of Change indicator exceeding its threshold range as a warning to a user rather than an alert that the purity level has fallen below an acceptable limit. Thus, after 50 minutes, an amber alert is raised and the amber light 24 is illuminated. The $ROC_t$ indicator has been found to advantageously provide advance warning of changing reactant purity and a useful early warning of purity levels potentially decreasing below acceptable levels.

FIG. 2c shows the $Delta_t$ indicator 222. The $delta_t$ value has an associated threshold range 220, 221, which, in this example comprises −0.005 to +0.005. The $delta_t$ value exceeds the threshold range at 102 minutes from when monitoring began. Accordingly, the red light 25 is illuminated by the controller.

It will be appreciated that the threshold values and ranges may be selected depending on the application. Further, the predetermined constants, $\alpha_1$ and $\alpha_2$, may be tuned to the particular application.

FIG. 3 shows a second embodiment which may be used to determine the purity of more than one of the reactants. In this embodiment, the same reference numerals have been used for identical features. This embodiment comprises a third fuel cell 33 which is identical in construction to the first and second fuel cells 11, 12. Rather than receive its fuel from the purifier 16, the first fuel cell 11 receives fuel from a separate, pure source 7, although this is not a requirement when the three (or more) fuel cells 11, 12, 33 are provided. The third fuel cell is configured to receive its supply of fuel from the pure fuel source 7. While the first and second fuel cells 11, 12 draw in the other of their reactants (air) from the atmosphere via vents 29, 30, the third fuel cell 33 receives air from a purified air source 34. The purified air source may be an air purification device and/or filter or air from a storage vessel. The third fuel cell 33 includes an electrical output 35 which connects to the controller 20.

The controller 20 is configured to apply a load and sample the electrical output of the third fuel cell 33 as is performed for the first and second fuel cell. In addition to the electrical output difference $OD_t$, which is determined from the difference between electrical output of the first fuel cell and second fuel cell 12, the controller is also configured to determine the output difference $OD_t$ between the first and third fuel cells 11, 33. Considering the first and third fuel cells, they receive the same purity of fuel but the third fuel cell 33 acts as a reference for the purity of the air and the first fuel cell receives the "test", atmospheric air. Thus, the difference in electrical output between the first and third fuel cells 11, 33 is (substantially) due to differences in air purity.

The controller may alternatively or in addition be configured to determine the output difference between the second and third fuel cells 12, 33. Considering the second and third fuel cells, they receive (potentially) different purity of fuel and (potentially) different purity of air. However, the third fuel cell 33, given that it receives pure air and pure fuel will not be contaminated in use. Thus, the difference in electrical output between the second and third fuel cells 12, 33 is (substantially) due to degradation of the second fuel cell 12 due to contamination during use. Thus, the electrical output difference between the second and third fuel cells is advantageous and can be analysed using the indicators discussed above.

The purity output 22 traffic light display is replaced by the generation of a report (not shown) that may be reported to the filling station and/or a distribution network controller.

In a further embodiment, a fourth fuel cell may be provided which receives its hydrogen fuel form source 5 and its air supply from the pure air source 34. Thus, the apparatus is as shown in the table below.

|  | Third Reactant Source (Pure Air) | Fourth Reactant Source (Atmospheric air) |
|---|---|---|
| First Reactant Source (Pure $H_2$) | Third fuel cell | First fuel cell |
| Second Reactant Source (Unknown purity $H_2$) | Fourth fuel cell | Second Fuel cell |

An output difference between the first and second fuel cells and the difference between the third and fourth fuel cells provides two determinations of fuel purity. An output difference between the first and third fuel cells and the difference between the second and fourth fuel cells provides two determinations of air (or other oxidant) purity. This may provide more reliable determinations.

Figure 4:
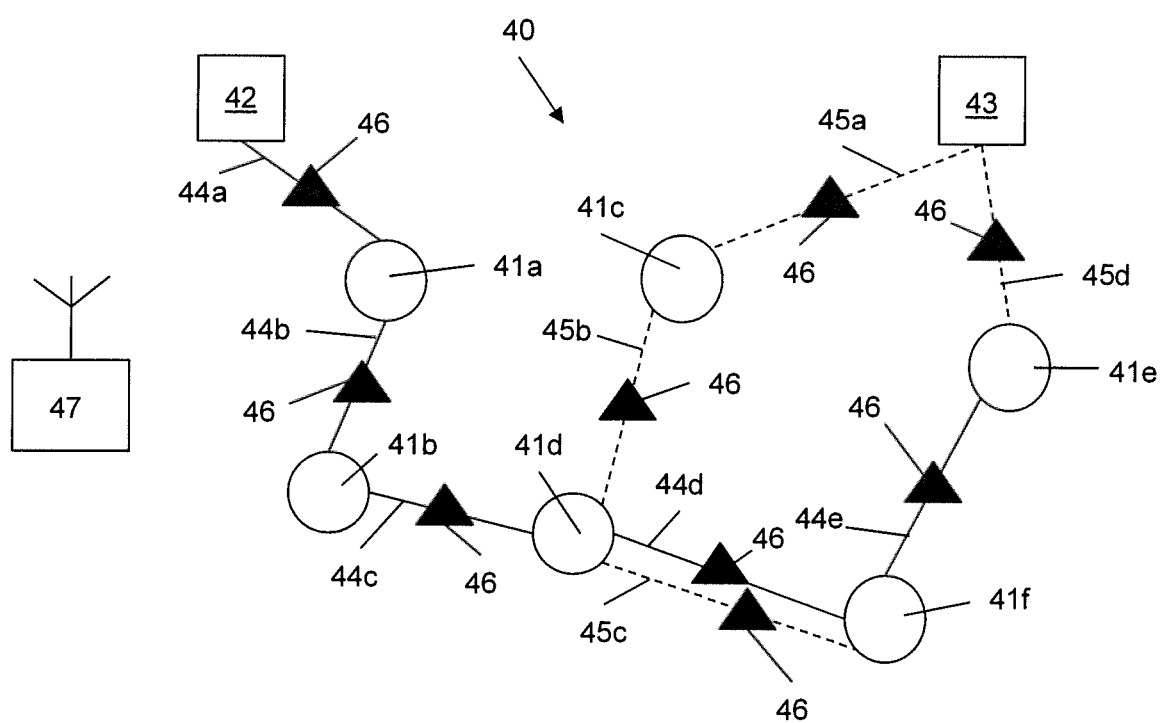
FIG. 4 shows a reactant distribution system for reconfiguring a reactant distribution network.

A reactant distribution system may utilise the purity output 22 to configure a reactant distribution network. FIG. 4 shows a reactant distribution network 40 which, in this example, comprises a hydrogen distribution network for delivering fuel to a plurality of reactant use locations 41a-f. The reactant use locations 41a-f may comprise dispensing locations, such as hydrogen filling stations at which users of fuel cell powered vehicles may fill their vehicle with hydrogen fuel. Each reactant use location includes a reactant purity sensor, which may comprise the apparatus 10 described above, although any appropriate purity sensor may be used.

The network 40 receives its supply of hydrogen fuel from a first network source 42 and a second network source 43. The network sources may comprise hydrogen generation plants or bulk storage depots.

The network 40 comprises a plurality of pathways 44a-e and 45a-d which connect the network sources 42, 43 with the dispensing locations 41a-f. The pathways, in this example, comprise conduit along which the fuel may flow. However, it will be appreciated, that the pathways 44a-e and 45a-d may comprise segments of a predetermined delivery route of a reactant delivery vehicle. In this example, the network 40 comprises a first part supplied by the first network source 42 comprising locations 41a, 41b, 41d, 41f and 41e. These locations are supplied sequentially via the pathways 44a-e. The network 40 further comprises a second part supplied by the second network source 43 comprising locations 41c, 41d, 41f and 41e. Locations 41c, 41d, 41f are supplied sequentially via the pathways 45a, 45b and 45c. Location 41e is supplied directly from the second network source 43 via pathway 45d.

Each pathway 44a-e, 45a-d includes a valve 46, which can be actuated to prevent flow along it. Thus, actuation of the valve 46 of pathway 44c will prevent fuel from the first network source 42 reaching downstream locations comprising 41d, 41f and 41e.

The system may include a controller 47 which receives the output of the sensors at each location 41a-f and can control the valves 46. This may be performed by wireless communication or otherwise.

In a first example the valves of pathways 45b, 45c and 45d are closed. Thus, locations 41a, 41b, 41d, 41f, 41e sequentially receive fuel from the first network source 42. Location 41c receives fuel from the second network source 43.

In use, a poor reactant quality indicator may be received from the sensor at location 41b. The controller 47 may be configured to locate the sensor in the network 40 and thus identify that pathway 44c is downstream of location 41b. Accordingly, to prevent the poor purity fuel from reaching further dispensing locations, namely, locations 41d, 41f and 41e, the controller may thus automatically issue a signal to cause the actuation of the valve 46 of pathway 44c. There may be a source of contamination in the network around location 41b. Accordingly, dispensing locations 41d, 41f and 41e are isolated from the first network source 42 and the part of the network between source 42 and valve 46 of pathway 44c. The controller 47 may use further signals to further valves of further downstream pathways to actuate them to prevent the distribution of poor purity fuel.

Alternatively or in addition, the controller 47 may provide inhibition signals to use locations 41b, 41d, 41f and 41e to stop them using or dispensing fuel. This is advantageous as it prevents potentially contaminated fuel being dispensed into user's vehicles.

It will be appreciated that the valve 46 of pathway 44c may, in an alternate embodiment, represent the receipt of a signal in a fuel delivery vehicle to control the route followed by the vehicle. Thus, the vehicle may have been scheduled to deliver to the locations 41a, 41b, 41d, 41f and 41e in sequence. Thus, the signal may instruct the delivery vehicle, in real time, to change its route so as not to deliver to the downstream locations 41d, 41f and 41e.

The controller 47 may also issue an alternate supply signal to cause further reconfiguration of the network 40 such that dispensing locations affected by the closure of the valve 46 of pathway 44c can be supplied from a different source, such as the second source 43. Thus, the alternate supply signal is configured to cause the actuation of the valves 46 of pathways 45b, 45c and 45d such that the pathways are open to the flow of fuel from the second source 43. Accordingly, the dispensing locations 41d and 41f, isolated from the first network source 42 are now supplied with fuel from the second network source 43. Further, the dispensing location 41e is supplied directly from the second network source 43 rather than the first network source 42.

In an alternative embodiment, the alternate supply signal may define a route for a fuel supply vehicle or tanker from the second network source 43 to supply the affected dispensing locations. The alternate supply signal may define a modification to a pre-existing route of a fuel supply vehicle. Thus, valve 46 of pathway 45b may, in this alternate embodiment, rather than represent a valve, represent the receipt of an instruction for a fuel delivery vehicle to modify its intended route (which may be back to second network source 43) and instead continue to dispensing location 41*d* and 41*f*. A further vehicle may be sent an instruction to proceed to dispensing location 41*e*. Thus, the controller 47 can perform real-time reconfiguration of the routes followed by one of, or a fleet of, fuel supply vehicles, in the same way valves in a physical supply conduit infrastructure control the flow of fuel therealong. The signal from the controller 47 may generate an alert in the delivery vehicle and provide a message to the driver to change the route. Alternatively, the signal may provide instructions to automatically reconfigure a navigation guidance apparatus, such as a GPS guidance device, with a new route for the driver to follow.

In a further embodiment, filtration apparatus may be actuated in the network such that the network is reconfigured by way of a portion of the network receiving filtered reactant. The filtration apparatus may be located between dispensing locations and may be alongside any valves or provided instead of a valve. Thus, filtration apparatus may be actuated upstream and/or downstream of a dispensing location that reports poor reactant quality.

In a further embodiment, the reactant use locations 41*a-f* comprise stationary power devices such as for supplying backup power to mobile telecommunication masts. As the reactant use locations 41*a-f* provide backup power they may only be activated periodically and some more frequently than others. In this embodiment, the controller 47 is configured to use the distribution network to determine which reactant use locations received reactant from the same source 42, 43. Thus, it may consider reactant use locations downstream of an affected reactant use location and upstream. This is because, even though an upstream location may have received the potentially contaminated fuel before a location that has reported poor reactant purity, it may not have been active and thus the contaminated fuel may be stored at the upstream stationary power device ready for use. Accordingly, the controller 47 may provide an inhibition signal to the reactant use locations that received fuel from a common source. Alternatively, or in addition, the controller may reconfigure the distribution network such that new fuel is delivered to the affected reactant use locations 41*a-f*, possibly from a different source. The controller 47 therefore ensures an efficient network of reactant use locations.

The reactant distribution system may provide real-time information to a user of reactant purity at the fuel dispensing locations and any other location in the network. Thus, a user can see the reactant purity at each of the fuel dispensing locations in real time. This may comprise an aspect of the invention.

The invention claimed is:

1. An apparatus configured to determine reactant purity comprising;
   a first fuel cell configured to generate electrical current from the electrochemical reaction between two reactants, having a first reactant inlet configured to receive a test reactant comprising one of the two reactants from a first reactant source;
   a second fuel cell configured to generate electrical current from the electrochemical reaction between the two reactants, having a second reactant inlet configured to receive the test reactant from a second reactant source;
   a controller configured to apply an electrical load to each fuel cell and determine an electrical output difference, $OD_t$, between an electrical output of the first fuel cell and an electrical output of the second fuel cell, and determine a difference between a predicted output difference and the determined electrical output difference, $OD_t$, the predicted output difference determined based on a historical output difference and a historical rate of change in said output difference determined at an earlier time,
   said controller configured to provide a purity output indicative of the test reactant purity at least based on the difference between the predicted and determined output difference.

2. An apparatus according to claim 1, in which the controller is configured to determine at least three indicators at time t using two of the same indicators previously determined at an earlier time t−1, the indicators comprising a $Delta_t$ indicator representative of the difference between a predicted output difference and the determined output difference, a smoothed level indicator $SL_t$, and a rate of change indicator $ROC_t$, wherein;

$$Delta_t = OD_t - (SL_{t-1} + \Delta t \times ROC_{t-1})$$

$$SL_t = (SL_{t-1} + \Delta t \times ROC_{t-1}) + \alpha_1 \times Delta_t$$

$$ROC_t = ROC_{t-1} + \alpha_2 \times Delta_t$$

and $\Delta t$ comprises the time difference between time t and t−1, and $\alpha_1$ and $\alpha_2$ comprise predetermined values, wherein the purity output is determined using said indicators.

3. The apparatus according to claim 2, in which the controller is configured to determine one or more of:
   i) if the rate of change indicator exceeds a predetermined threshold range and, if so, provide a warning of changing reactant purity;
   ii) if the smoothed level indicator exceeds a predetermined threshold range and, if so, provide an indication that the reactant purity is unacceptable; and
   iii) if the $Delta_t$ indicator exceeds a predetermined threshold range and, if so, provide an indication that the reactant purity is unacceptable.

4. The apparatus according to claim 1, in which the purity output is determined using the electrical output difference, $OD_t$.

5. The apparatus of claim 1, in which the first reactant source provides a reference reactant of the test reactant, the reference reactant having a known purity and the second reactant source provides a fuel of an unknown purity.

6. The apparatus of claim 5, in which the first reactant source comprises a purification device, the purification device configured to purify part of the test reactant supplied from the second reactant source.

7. The apparatus according to claim 1, in which the test reactant comprises one of a fuel and an oxidant, such as atmospheric air.

8. The apparatus according to claim 1, in which the output difference is determined based on an average of a plurality of sampled electrical output values from the first fuel cell and the second fuel cell.

9. The apparatus according to claim 1, comprising a third fuel cell configured to generate electrical current from the electrochemical reaction between the two reactants, wherein the test reactant comprises a first test reactant and the other of the two reactants comprises a second test reactant;
   the first fuel cell configured to receive the first test reactant from the first reactant source and the second test reactant from a fourth reactant source;
   the second fuel cell configured to receive the first test reactant from the second reactant source and the second test reactant from the fourth reactant source;

the third fuel cell configured to receive the first test reactant from the first reactant source and the second test reactant from a third reactant source, the controller configured to determine an electrical output difference, $OD_t$, between an electrical output of the first and second fuel cell;

first and third fuel cell; and second and third fuel cell, the controller configured to give an indication of the first test reactant purity and the second test reactant purity at least based on a difference between a predicted output difference and the determined output difference, $OD_t$, the predicted output difference determined based on a historical output difference and a historical rate of change in said output difference for each of the output differences.

10. The apparatus according to claim 9, in which the first test reactant comprises a fuel and the second test reactant comprises air;

the first reactant source comprising a pure fuel source;

the second reactant source comprising a fuel source of unknown purity;

the third reactant source comprising a pure air source or an air source of unknown purity and the fourth reactant source comprising the other of the pure air source and air source of unknown purity.

11. The apparatus according to claim 10 in which the controller is configured to output an indicator of performance difference between the second fuel cell and the third fuel cell.

12. A method for determining an indication of reactant purity comprising;

measuring an electrical output of a first fuel cell having a load applied thereto and configured to generate electrical current from the electrochemical reaction between two reactants, one of the two reactants comprising a test reactant supplied from a first reactant source to the first fuel cell;

measuring an electrical output of a second fuel cell having a load applied thereto and configured to generate electrical current from the electrochemical reaction between the two reactants, the test reactant supplied to the second fuel cell supplied from a second reactant source;

determining an electrical output difference, $OD_t$, between an electrical output of the first fuel cell and an electrical output of the second fuel cell, providing an indication of the test reactant purity at least based on a difference between a predicted output difference and the determined output difference, the predicted output difference determined based on a historical output difference and a historical rate of change in said output difference.

13. A method according to claim 12, in which the step of providing an indication comprises;

determining at least three indicators at time t using two of the same indicators previously determined at time t−1, the indicators comprising a $Delta_t$ indicator representative of the difference between a predicted output difference and the determined output difference, a smoothed level indicator $SL_t$, and a rate of change indicator $ROC_t$, wherein;

$Delta_t = OD_t - (SL_{t-1} + \Delta t \times ROC_{t-1})$ $SL_t = (SL_{t-1} + \Delta t \times ROC_{t-1}) + \alpha_1 \times Delta_t$ $ROC_t = ROC_{t-1} + \alpha_2 \times Delta_t$ and $\Delta t$ comprises the time difference between time t and t−1, and $\alpha_1$ and $\alpha_2$ comprise predetermined values, wherein the method further comprises providing the indication of reactant purity using said indicators.

* * * * *